United States Patent [19]

Grolmes et al.

[11] Patent Number: 5,077,018

[45] Date of Patent: Dec. 31, 1991

[54] VENTED SAFETY VESSEL WITH ACOUSTIC TRAP FOR RAREFACTION WAVES

[75] Inventors: Michael A. Grolmes, Lisle; Hans K. Fauske, Hinsdale; Michael Epstein, Northbrook, all of Ill.

[73] Assignee: Westinghouse Electric Corp., Pittsburgh, Pa.

[21] Appl. No.: 62,287

[22] Filed: Jun. 12, 1987

[51] Int. Cl.⁵ ............................................. G05D 16/06
[52] U.S. Cl. .................................. 422/113; 422/117; 422/295; 422/310; 422/312
[58] Field of Search ............... 422/113, 117, 295, 310, 422/312

[56] References Cited

U.S. PATENT DOCUMENTS

| | | | |
|---|---|---|---|
| 384,884 | 6/1888 | Wood | 422/117 X |
| 3,574,560 | 2/1974 | Von Strum et al. | 422/113 |
| 3,853,484 | 12/1974 | Sudar et al. | 422/113 |
| 4,127,384 | 11/1978 | Fahlvik et al. | 422/295 X |
| 4,255,387 | 3/1981 | Gardner | 422/117 X |
| 4,339,412 | 7/1982 | Durand et al. | 422/113 X |
| 4,353,870 | 10/1982 | Munnichs et al. | 422/310 X |

OTHER PUBLICATIONS

Chemical Engineers' Handbook, R. H. Perry, C. H. Chilton, 5th Edition, McGraw Hill Book Co., N.Y., p. 5-5.

Primary Examiner—Robert J. Warden
Assistant Examiner—Amalia Santiago
Attorney, Agent, or Firm—Z. L. Dermer

[57] ABSTRACT

An acoustical wave trap is combined with the rupture disc or relief valve used in vessels for storing potentially explosive materials. The acoustical wave trap operates to substantially reduce the magnitude of the rarefaction wave produced within the vessel when the rupture disc or relief valve opens, and thereby simplifies the pressure relief requirements.

12 Claims, 1 Drawing Sheet

VENTED SAFETY VESSEL WITH ACOUSTIC TRAP FOR RAREFACTION WAVES

BACKGROUND OF THE INVENTION

1. Field of the Invention

The present invention relates generally to the field of storage or process vessels for potentially explosive materials and more particularly to a new and improved explosion venting arrangement.

2. Background of the Invention

An internal explosion in a chemical storage or process vessel resulting from the ignition of flammable gas mixtures invariably leads to rapid and high pressure increases. The commonly used means of protection against the damaging effects of an explosion in a chemical reactor vessel or storage silo is an appropriately sized relief valve or vent designed to open at a predetermined pressure. Venting allows the burned and unburned gas to flow out of the vessel to thereby mitigate the pressure rise and decrease the amount of energy available for combustion inside the vessel. In actual practice the pressure drops caused by the outflow of materials through the vent does not compensate for the build-up of pressure from combustions as much as would be expected from measured rates of pressure rise in a closed reaction vessel.

Flame fronts are the most usual way for combustion to proceed. When an accidental self-ignition occurs locally inside a hot spot surrounded by a cold reactive mixture, a combustion wave is initiated from the exothermic center. When the combustion wave takes the form of a detonation characterized by super-sonic propagation speeds in the mixture, venting is useless since vents are unable to react in a sufficiently short time to relieve the pressure. For mild accidental ignition venting is useful since a deflagration is initiated and subsonic combustion wave propagation speeds are produced. Propagation is by the diffusive transport of mass and energy and is usually less than several meters per second. In enclosed vessels the rate of pressure rise can usually be detected at the walls of the vessel well in advance of the arrival of the deflagration flame front. Thus, there is usually time for vents to open and affect the course of the explosion.

If a gas mixture is ignited centrally in a sealed, compact vessel of low length-to-diameter ratio, a smooth spherical (laminar) flame propagates outwardly with no significant distortion. Some flame wrinkling may appear during the later stage of flame development, owing to diffusion and/or buoyancy effects, but it usually has no significant effect on the flame growth and, therefore, on the vessel pressure-time history. Accordingly, predictions based upon smooth flame models are able to match the experimental measurements of pressure in closed vessel explosions as documented by D. Bradley and A. Mitcheson, "Mathematical Solutions for Explosions in Spherical Vessels", Combustion and Flame, 26, 201–217 (1976).

The laminar flame model breaks down, however, with vented vessels subsequent to vent opening. The sudden opening of a vent produces a rapid increase in gas-velocity which in turn produces a centered expansion wave or rarefaction wave at the vent. This rarefaction wave propagates back into the vessel and interacts with the expanding flame front. The resulting pressure and velocity disturbance is believed to initiate a hydrodynamic instability within the flame front accompanied by an increase in the combustion rate and rapid pressure development. Thus in a vessel with an initially closed vent, the pressure at first follows the dependency observed for confined expanding flames. There is a slight decline in the pressure-time profile immediately after the vent opens due to the venting temporarily overcoming the combustion rate. Very quickly, however, due to the interaction of the rarefaction wave, the pressure in the vented vessel turns around and rises at a rate considerably greater than that measured in an unvented vessel. This phenomenon limits the accuracy with which proper vent sizing may be determined and as a result generally requires oversize and expensive venting devices and systems larger than might otherwise be indicated.

OBJECTS AND SUMMARY OF THE INVENTION

From the foregoing discussion it will be understood that among the various objectives of the present invention are included the following:

the provision of a chemical storage or reactor vessel having a new and improved explosion vent;

the provision of apparatus of the above-described character which minimizes the effect of the rarefaction wave generated by the opening of the vent; and the provision of apparatus of the above-described character using an acoustical wave trap in conjunction with conventional venting means.

These and other objectives of the present invention are efficiently met by introducing an acoustical wave trap between the chemical vessel and a conventional rupture disc or pressure relief valve. When the disc or valve opens, the rarefaction wave must traverse the acoustical wave trap where it is substantially dissipated, thereby preventing acceleration of the flame front and the increased pressure observed with conventional venting devices.

The foregoing as well as other objects, features and advantages of the present invention will become better understood from the following detailed description taken in conjunction with the various views of the appended drawings.

DESCRIPTION OP THE PREFERRED EMBODIMENTS

Figure 1A:
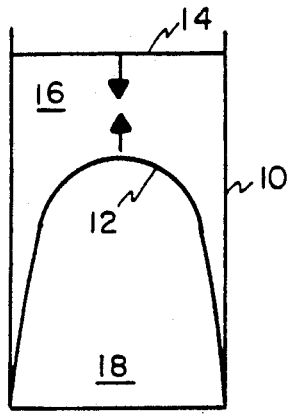
FIGS. 1A–C are schematic illustrations of the interaction between the rarefaction wave and flame front upon opening of a conventional venting device as observed by G. H. Markstein, "A Shock-Tube Study of Flame Front-Pressure Wave Interaction", 6th Symp. (Int.) on Combustion, 387–389, Reinhold, New York, (1957)
Figure 1B:
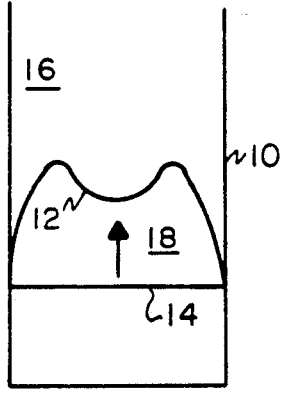
Figure 1C:
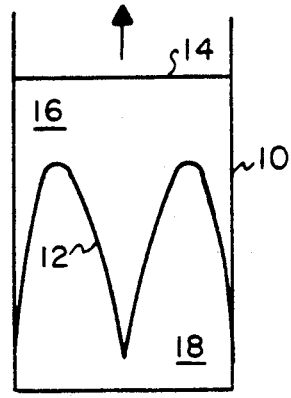

With reference now to FIGS. 1A–C there is shown a chemical vessel 10 in which a flame front 12 has begun to propagate in the direction indicated by the arrow. When a pressure relief vent (not shown) opens, the rarefaction shock wave 14 propagates through the unburned gases back toward the flame front 12. The shock wave 14 coming from the unburned dense gas 16 accelerates the flame 12 in the stabilizing direction. The curved flame front 12 tends to flatten as shown in FIG. 1B, causing an indentation in the center and thereby reversing the original shape. After the transmitted shock wave 14 reflects from the closed end of the vessel 10 and catches up with the flame front 12, the acceleration is reversed, with the light unburned gases 18 accelerating towards the more dense unburned gases 16. This enhances the indentation and transforms it into a spike. The formation of the spike and the roughening of its surface must be accompanied by an increase in the flame front surface area and thus the instantaneous volumetric rate of burning. Multiple shock wave reflections cause the flame surface to be periodically accelerated in the stable and unstable directions, leading too a highly folded flame structure within a matter of milliseconds.

Figure 2:
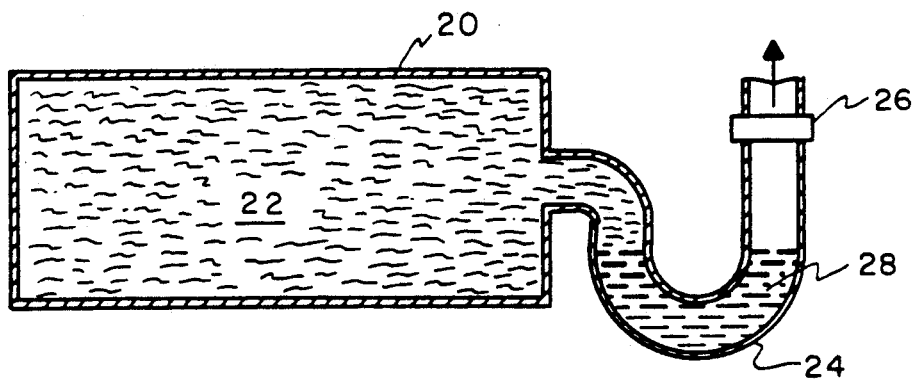
FIG. 2 is a schematic cross-section view of a chemical vessel equipped with an acoustic wave trap in accordance with the present invention.

Turning now to FIG. 2 there is shown in a schematic cross-section view a chemical vessel 20, which could be either a reactor or a storage vessel, containing a potentially explosive gas 22. A manometer-shaped vent line 24 is coupled at one end to the chemical vessel 20 and normally closed at its other end by any conventional pressure relief device 26 such as a rupture disc or relief valve both of which are well known in the art. The manometer 24 is filled with a fluid 28 having a density much greater than the density of the gas 22 contained by the vessel 20.

In the event of a deflagration within the vessel 20 the internal pressure increases and the gas trapped between the fluid column 28 and the relief device 26 will compress and transmit the vessel pressure to the relief device 26. When the release or rupture pressure of the relief device 26 is exceeded, the trapped gas will vent and create a rarefaction wave which propagates back through the fluid column 28 toward the vessel 20. The amplitude of the rarefaction wave will be substantially reduced after traversing the fluid column 28 due to the high compressibility of the gas 22 in vessel 20 relative to that of the fluid 28. By substantially reducing or eliminating the rarefaction wave, acceleration of the flame front and the corresponding pressure increase observed with conventional venting devices is also substantially reduced or eliminated.

The maximum reduction of the rarefaction wave amplitude is proportional to the vessel gas-to-fluid density ratio (preferably on the order of 1:100). The maximum reduction will generally not be achieved in actual practice since wave reflections within the fluid column 28 will cause the transmitted expansion wave to recover a certain amount of its strength. Fluid friction and interfacial (liquid-gas) instabilities will limit the extent of momentum reconversion.

A variety of level, mass, or sight-gauging instruments are adaptable for use with the manometer 24 to permit inspection to determine that the fluid column is present and sufficient.

Figure 3:
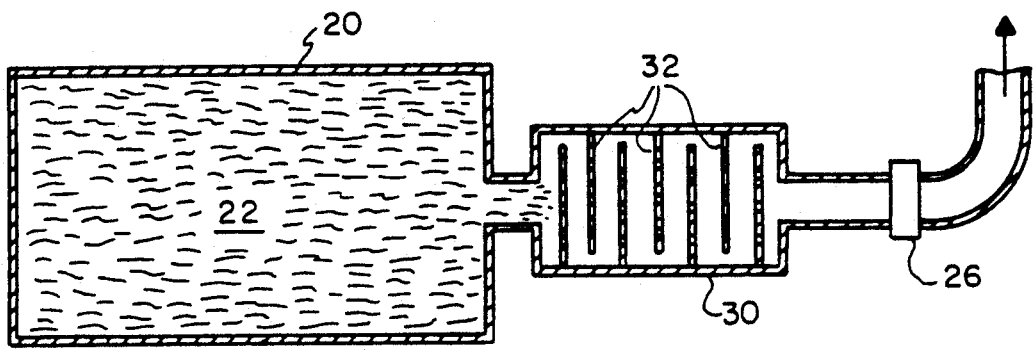
FIG. 3 is a schematic cross-section view of an alternative embodiment of the present invention.

FIG. 3 is a schematic cross-section view of an alternative embodiment of the apparatus of the present invention wherein elements common to those illustrated in FIG. 2 are identified by like reference characters. In this embodiment the acoustic wave trap comprises a housing 30 having an inlet coupled to the vessel 20 and an outlet coupled to the pressure relief device 26. Disposed within the housing 30 are baffle plates 32 which serve to break up the rarefaction wave created when the relief device 26 releases with the same dissipating effect as a muffler on an internal combustion engine. Although the fluid-filled manometer type trap of FIG. 2 may be very effective in reducing or eliminating rarefaction waves and would be appropriate for some applications, others may impose orientation or other restrictions. The liquid-free embodiment of FIG. 3 offers further flexibility in location, configuration, material selection and requires negligible monitoring or maintenance.

From the foregoing it will be understood that the applicants have provided a new and novel explosion vent for chemical vessels whereby the objectives set forth hereinabove are efficiently met. Since certain changes in the above-described construction will occur to those skilled in the art without departure from the scope of the invention, it is intended that all matter set forth hereinabove or shown in the various views of the appended drawings shall be interpreted as illustrative and not in a limiting sense. Having described what is new and novel and desired to secure by Letters Patent, what is claimed is:

What is claimed is:

1. A vented safety vessel comprising, in combination, a principal vessel portion adapted to receive the major portion of a charge of potentially explosive contents, and a combination acoustic wave trap and venting assembly adapted to attenuate the intensity and effect of a rarefaction wave entering the vessel when an elevated pressure in the vessel is suddenly vented to the atmosphere, said principal vessel portion being comprised of walls defining an enclosed vessel interior, said vessel walls being imperforate in use except for means defining a vent passage opening in at least one of said vessel walls, said combination acoustic wave trap and venting assembly including a venting tube of a given cross-sectional area, a venting tube outlet disposed at one end of said venting tube, a venting tube inlet disposed at the other end of said venting tube, said venting tube inlet portion being of substantially the same cross-sectional area as the cross-sectional area of said venting tube outlet, pressure relief means closing off said end of said venting tube outlet and being operative to suddenly open said venting tube to the atmosphere when pressure in said vessel interior reaches a predetermined level, and an acoustic wave trap disposed in said venting tube between said tube inlet portion and said tube outlet portion, said opening in said vessel sidewall being operative to provide a path of communication between said vessel interior and said tube inlet portion, said acoustic wave trap having means forming a part thereof for attenuating the intensity of a rarefaction wave being propagated from said vessel exterior through said tube outlet into said wave trap, and toward said vessel interior.

2. A vented safety vessel as defined in claim 1 wherein said acoustic wave trap includes a portion of substantially enlarged diameter and cross-sectional area relative to said cross-sectional area of said tube inlet and outlet portions, said enlarged diameter portion including baffle means disposed therein for providing said wave trap action.

3. A vented safety vessel as defined in claim 1 wherein said pressure relief means comprises a rupture disc.

4. A vented safety vessel as defined in claim 1 wherein said means forming a part of said wave trap constitutes a tube configured to provide a reservoir for fluid having a density substantially greater than the density of said potentially explosive contents in said vessel interior.

5. A vented safety vessel as defined in claim 1 wherein said venting tube includes a U-tube portion filled with a liquid to provide said acoustic wave trap.

6. A vented safety vessel as defined in claim 5 wherein said venting tube having said U-tube portion forming a part thereof is of substantially the same diameter throughout its length.

7. A vented safety vessel as defined in claim 5 wherein said venting tube includes a portion of substantial length disposed between said pressure relief means and the upper surface of said liquid in said U-tube portion of said venting tube.

8. A venting safety vessel as defined in claim 2 wherein said baffle means includes a portion of the radial walls forming a part of said enlarged diameter passage.

9. A combination acoustic wave trap and venting assembly adapted for attachment to a vent opening in a wall defining in part the interior of a vessel adapted to receive the major portion of a charge of potentially explosive contents, said wave trap and venting assembly being adapted to attenuate the intensity and effect of a rarefaction wave entering an associated vessel when an elevated pressure in the vessel is suddenly vented to the atmosphere, said combination acoustic wave trap and venting assembly including a venting tube of a given cross-sectional area, a venting tube outlet disposed at one end of said venting tube, a venting tube inlet disposed at the other end of said venting tube, said venting tube inlet portion being of substantially the same cross-sectional area as the cross-sectional area of said venting tube outlet, pressure relief means closing off said end of said venting tube outlet and being movable suddenly to an open position when said relief means is exposed to a predetermined level of pressure, and an acoustic wave trap disposed in said venting tube between said tube inlet portion and said tube outlet portion, said acoustic wave trap having means forming a part thereof for attenuating the intensity of a rarefaction wave being propagated from the atmosphere exterior to said pressure relief means through said tube outlet into said wave trap, and toward said inlet end of said venting tube.

10. An assembly as defined in claim 9 wherein said acoustic wave trap includes a chamber of enlarged cross-section disposed in said venting tube, said chamber including a plurality of spaced apart baffles.

11. An assembly as defined in claim 9 wherein said acoustic wave trap comprises a tube configured to provide a reservoir for fluid having a density substantially greater than the density of said potentially explosive contents in said associated vessel.

12. An assembly as defined in claim 9, wherein said pressure relief means comprises a rupture disc.

* * * * *